US010567428B2

(12) United States Patent
Chhabra et al.

(10) Patent No.: US 10,567,428 B2
(45) Date of Patent: Feb. 18, 2020

(54) SECURE WIRELESS RANGING

(71) Applicant: Apple Inc., Cupertino, CA (US)

(72) Inventors: Kapil Chhabra, Cupertino, CA (US); Welly Kasten, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/031,459

(22) Filed: Jul. 10, 2018

(65) Prior Publication Data
US 2018/0332075 A1 Nov. 15, 2018

Related U.S. Application Data

(63) Continuation of application No. 15/227,391, filed on Aug. 3, 2016, now Pat. No. 10,033,760.
(Continued)

(51) Int. Cl.
  *G06F 11/00* (2006.01)
  *H04L 29/06* (2006.01)
  (Continued)

(52) U.S. Cl.
  CPC ...... *H04L 63/1466* (2013.01); *H04L 63/0435* (2013.01); *H04L 67/18* (2013.01);
  (Continued)

(58) Field of Classification Search
  CPC .......... H04L 63/0435; H04L 63/1466; H04W 12/02; H04W 12/12; H04W 12/00503;
  (Continued)

(56) References Cited

U.S. PATENT DOCUMENTS 7,039,392 B2 * 5/2006 McCorkle ............... G01S 7/023
  455/411
7,149,529 B2 * 12/2006 Parry ...................... H04L 29/06
  455/456.1
(Continued)

FOREIGN PATENT DOCUMENTS

CN 102638762 A 5/2006

OTHER PUBLICATIONS

Boureanu et al., "On the Need for Secure Distance Bounding," Early Symmetric Crypto (ESC) Seminar, Jan. 1, 2013; 9 pages.
Extended European Search Report directed to European Patent Application No. 17165458.5, dated Sep. 12, 2017; 7 pages.

*Primary Examiner* — Samson B Lemma
(74) *Attorney, Agent, or Firm* — Sterne, Kessler, Goldstein & Fox P.L.L.C.

(57) ABSTRACT

Embodiments for securely determining a separation distance between wireless communication devices is provided. These embodiments include receiving a measurement request and a first random identifier from a first wireless communication device at a second wireless communication device. The embodiments also includes deriving a transient key using the first random identifier, a second random identifier (generated by the second device), and a pre-shared key. The first and second random identifiers, the pre-shared key, and the transient key derived therefrom are shared between the first and second devices, but are not known to any other devices. The embodiments further include encrypting measurement data exchanged between the two devices using the transient key, and using the encrypted measurement data to calculate and verify a separation distance between the devices. The embodiments thus prevent dishonest wireless communication devices from intercepting communications and spoofing a location of one of the two honest devices.

19 Claims, 5 Drawing Sheets

Related U.S. Application Data

(60) Provisional application No. 62/342,466, filed on May 27, 2016.

(51) Int. Cl.
| | |
|---|---|
| *H04W 64/00* | (2009.01) |
| *H04W 4/80* | (2018.01) |
| *H04W 12/02* | (2009.01) |
| *H04L 29/08* | (2006.01) |
| *H04W 12/12* | (2009.01) |
| *G01S 5/02* | (2010.01) |
| *H04W 84/12* | (2009.01) |
| *H04W 88/02* | (2009.01) |

(52) U.S. Cl.
CPC ............ *H04W 4/80* (2018.02); *H04W 12/02* (2013.01); *H04W 12/12* (2013.01); *H04W 64/003* (2013.01); *G01S 5/0289* (2013.01); *H04L 2463/121* (2013.01); *H04W 84/12* (2013.01); *H04W 88/02* (2013.01)

(58) Field of Classification Search
CPC ....... H04W 4/80; H04W 4/02; H04W 64/003; H04W 84/12
USPC .......................................................... 726/22
See application file for complete search history.

(56) References Cited

U.S. PATENT DOCUMENTS

| | | | |
|---|---|---|---|
| 7,515,917 B2 | 4/2009 | Casey | |
| 7,837,119 B2* | 11/2010 | Graf | G06K 7/0004 235/492 |
| 8,068,784 B2* | 11/2011 | Takayama | H04L 63/045 455/41.2 |
| 8,310,379 B2* | 11/2012 | Johnson | G06Q 10/08 340/988 |
| 8,698,605 B2* | 4/2014 | Kim | H04L 9/3271 340/10.1 |
| 8,718,554 B2* | 5/2014 | Abel | H04B 5/0031 455/41.2 |
| 9,292,707 B1* | 3/2016 | Fontecchio | H04L 63/0876 |
| 10,033,760 B2 | 7/2018 | Chhabra et al. | |
| 10,085,136 B2* | 9/2018 | Ignatchenko | H04L 5/16 |
| 2004/0203600 A1* | 10/2004 | McCorkle | G01S 7/023 455/411 |
| 2005/0116813 A1* | 6/2005 | Raskar | G06K 7/0004 340/10.1 |
| 2013/0016708 A1* | 1/2013 | Haba | H04W 48/16 370/338 |
| 2013/0102252 A1* | 4/2013 | Rasmussen | H04K 1/04 455/41.2 |
| 2017/0346852 A1 | 11/2017 | Chhabra et al. | |

\* cited by examiner

SECURE WIRELESS RANGING

CROSS REFERENCE TO RELATED APPLICATIONS

This application is a continuation of U.S. patent application Ser. No. 15/227,391, filed Aug. 3, 2016, now allowed, which claims the benefit of U.S. Provisional Appl. No. 62/342,466, filed May 27, 2016, now expired, all of which are incorporated by reference in their entirety.

FIELD

The disclosure generally relates to wireless communications, and more specifically to performing secure wireless ranging.

BACKGROUND

Related Art

Over the past couple decades, consumer electronic devices have become an increasingly important part of people's everyday lives. These electronic devices include everything from cellphones, laptops, and tablets to televisions and smartwatches. More recently, many consumer electronic devices have been adapted to include wireless communication capabilities, such that these devices can communicate and coordinate with one another. For example, with the increasingly widespread availability and use of wirelessly-enabled electronic devices, individuals may now be able to perform tasks, such as wirelessly unlock/lock a vehicle or computer, and wirelessly interact with a television or radio all from the individuals' cellphones or smartwatches.

While the ability for these electronic devices to wirelessly communicate with one another brings about exciting new opportunities, these advancements also introduce new challenges, such as those involving security. Indeed, in many instances it may be important to ensure that an individual's electronic device is within a certain distance from another device that it is seeking to interact with. For example, it may be undesirable to allow an individual's vehicle or computer to become unlocked when the individual's cellphone or smartwatch (and thus presumably the individual himself) is over a kilometer away, as such a large separation distance could potentially allow an unintended third party to gain unauthorized access to the vehicle or computer.

The most common types of security threats to these distance-based wireless communications (e.g., wireless ranging) are sometimes collectively referred to as "relay attacks." While relay attacks come in many different forms—e.g., distance fraud attack, mafia fraud attack, terrorist fraud attack, and distance hijacking—each type of attack typically involves a dishonest individual attempting to gain access to a honest individual's device by convincing the honest device that it is interacting with another honest device that is closer than it actually is. For example, mafia fraud attacks can occur when a dishonest individual's device is positioned between a first honest device (e.g., an honest individual's computer) and a second honest device (e.g., the honest individual's cellphone). In such a scenario, the dishonest device may be able to intercept communications between the honest devices, and send out its own dishonest signals. For example, the dishonest device may attempt to send a dishonest signal to an honest computer to trick the honest computer into thinking that an honest cellphone is closer than it actually is—e.g., at the dishonest device's location. The end result may be that the honest computer becomes unlocked, thereby giving the dishonest device access to the contents of the honest computer, all without the honest individual's knowledge.

Recently, certain "distance bounding protocols" have been introduced as a potential means for preventing relay attacks, some of which have been codified by the IEEE 802.11 standard: 802.11v and 802.11mc. However, the distance bounding protocols introduced to—date share a common flaw: the signals communicated between the wireless-enabled devices—which are intended to confirm the devices' identities and locations—are not encrypted. Therefore, even using these distance bounding protocols, a dishonest device can still intercept communications and manipulate the payloads, and thereby potentially gain unauthorized access to the contents of the wireless-enabled devices.

SUMMARY

The present disclosure provides system, apparatus, method, and computer program product embodiments for performing secure wireless ranging.

Wireless ranging generally refers to using round trip time (RTT) measurements of signals exchanged between two wireless communication devices to determine a separation distance between the devices. Conventional wireless ranging techniques—such as those described in IEEE 802.11v and 802.11mc—can be undesirable in some instances because such techniques do not encrypt the signals exchanged between the wireless communication devices. This lack of encryption can leave the wireless communication devices vulnerable to "relay attacks," such as distance fraud attacks, mafia fraud attacks, terrorist fraud attacks, and distance hijacking. The primary purpose behind a relay attack is to spoof one of the wireless communication devices into thinking that the other wireless communication device is located closer than it actually is. If successful, the device carrying out the relay attack (the dishonest wireless communication device) may be able to gain unauthorized access to the tricked wireless communication device.

However, embodiments discussed herein prevent relay attacks by ensuring that the measurement signals exchanged between wireless communication devices are encrypted (e.g., secure wireless ranging). The secure wireless ranging techniques disclosed herein may be applicable to several different types of wireless technologies, such as, without limitation, Wi-Fi, Bluetooth, radio-frequency identification (RFID), near field communications (NFC), 60 GHz communications, and cellular communication, as well as several different types of wireless communication devices.

In an embodiment, the secure wireless ranging techniques disclosed herein may include sending a measurement request along with a first random identifier from a first wireless communication device to a second wireless communication device. The second wireless communication device may then derive a transient key using the first random identifier, a second random identifier (generated by the second wireless communication device), and a pre-shared key. The first and second random identifiers, and the pre-shared key represent values that are shared between the first and second wireless communication devices, but are not known to any other wireless communication devices. Therefore, the derived transient key may also represent a value that is shared only between the first and second wireless communication devices. The transient key may then be used to encrypt future communications between the two wireless communication devices.

Moreover, the derived transient key may be unique to each communication session between the two wireless communication devices, and thus cannot be predicted or replayed by potential dishonest wireless communication devices. In an embodiment, the transient key may be a sequence of 232 randomized bits, in which different sets of bits are used to encrypt different communications between the two wireless communication devices. In some embodiments, the bits may be grouped into sets of 52, 104, or 208 bits, to provide some examples. However, bits may be grouped together in any number ranging from 24 bits to 232 bits without departing from the spirit and scope of the present disclosure. As an illustrative example, the first 52 bits of the transient key may be used by the first wireless communication device to encrypt a sounding symbol transmitted to the second wireless communication device. Similarly, the second 52 bits of the transient key may be used by the second wireless communication device to encrypt a sounding symbol transmitted to the first wireless communication device. Finally, the last 128 bits of the transient key may be used to encrypt the actual measurement data exchanged between the two devices. In an embodiment, the encrypted measurement data can then be used to calculate a separation distance between the first and second wireless communication devices, and to determine whether the first wireless communication device is within a communication area of the second wireless communication device.

Thus, the secure wireless ranging embodiments disclosed herein ensure that the communications exchanged between the two wireless communication devices are encrypted, thereby preventing potential dishonest devices from intercepting signals exchanged between the two wireless communication devices and spoofing a location of one of the devices.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
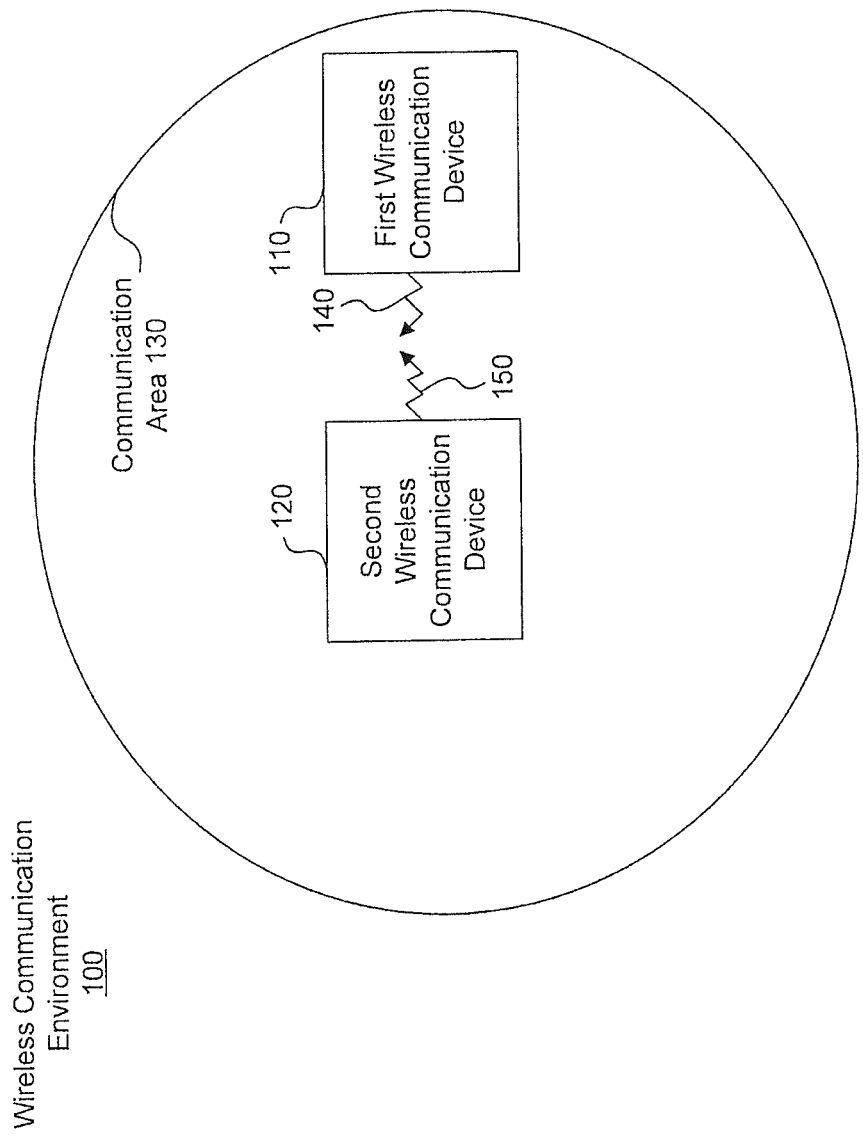
FIG. 1 illustrates a block diagram of a first wireless communication environment according to an exemplary embodiment of the disclosure.

FIG. 1 illustrates a block diagram of a wireless communication environment according to an exemplary embodiment of the disclosure. A wireless communication environment 100 provides wireless communication of information, such as one or more commands and/or data, between a first wireless communication device 110 and a second wireless communication device 120. Those skilled in the relevant art(s) will recognize that wireless communication devices 110 and 120 may be configured to communicate using any one of Wi-Fi, Bluetooth, radio-frequency identification (RFID), near field communications (NFC), 60 GHz communications, cellular communication, or the like. Additionally, wireless communication devices 110 and/or 120 may be implemented as a standalone or a discrete device or may be incorporated within or coupled to another electrical device or host device, such as a cellphone, smartwatch, portable computing device, a camera, nor a Global Positioning System (GPS) unit or another computing device such as a personal digital assistant, a video gaming device, a laptop, a desktop computer, or a tablet, a computer peripheral such as a printer or a portable audio and/or video player, and could also be implemented as a key fob, a vehicle remote access device or access/locking device in other mechanisms, or a household appliance, to provide some examples and/or any other suitable electronic device that will be apparent to those skilled in the relevant art(s) without departing from the spirit and scope of the present disclosure.

In an embodiment, first wireless communication device 110 may be configured to transmit a first wireless signal 140 toward second wireless communication device 120 using any acceptable modulation scheme. Second wireless communication device 120 may be configured to receive the first wireless signal 140, process the signal 140 and, if necessary, transmit a second wireless signal 150 back to the first wireless communication device 110. In this manner, first wireless communication device 110 and second wireless communication device 120 exchange information ("communicate") with one another. The signals exchanged between first and second wireless communication devices 110 and 120 may represent any number of different signals types, including: activation/deactivation signals, lock/unlock signals, and status manipulation signals, to provide some examples.

First wireless communication device 110 may represent an exemplary embodiment of a first user equipment, such as a smartwatch, and second wireless communication device 120 may represent an exemplary embodiment of a second user equipment, such as a laptop computer. Computer 120 may be configured such that, at a first point in time, it is placed into a locked state thereby rendering its contents inaccessible. Computer 120 may also be configured such that it can be unlocked using smartwatch 110. In such a scenario, smartwatch 110 may announce its presence and request that computer 120 change its status from locked to unlocked using one or more first wireless signals 140. Computer 120 may respond by verifying smartwatch 110's identity and the action being requested using one or more second wireless signals 150. Once verified, computer 120 may change its current state from locked to unlocked.

In some instances, however, it may be undesirable to allow a signal transmitted from first wireless communication device 110 to elicit a responsive action from second wireless communication device 120, when first wireless communication device 110 is too far away from second wireless communication device 120—e.g., outside of communication area 130. For example, in the scenario where second wireless communication device 120 represents a user's computer and where first wireless communication device 110 represents a smartwatch worn by the user, the user may not want the smartwatch to unlock the computer when the user is more than a kilometer away. Indeed, if such a large distance between the user's computer and smartwatch (being worn by the user) was permitted, then an unauthorized third party could potentially gain access to the user's computer while it is in an unlocked state.

Therefore, second wireless communication device 120 may also be configured to determine a separation distance between itself and first wireless communication device 110 to determine whether first wireless communication device 110 is within an acceptable range—i.e., within communication area 130. In an embodiment, communication area 130 may extend up to several meters away from second wireless communication device 120, yet other communication ranges may also be possible without departing from the spirit and scope of the present disclosure. Two methods that have been implemented in the past for allowing second wireless communication device 120 to determine its separation distance from first wireless communication device 110 have been codified a IEEE standards, and are specifically described in IEEE 802.11v and 802.11mc. Each of these methods involve the transmission of at least two sets of signals: (i) acknowledgement frames; and (ii) measurement frames. Through the transmission and receipt of these signals, second wireless communication device 120 can calculate a round trip time (RTT) relative to first wireless communication device 110, which it can then use to determine its separation distance from first wireless communication device 110.

Figure 2:
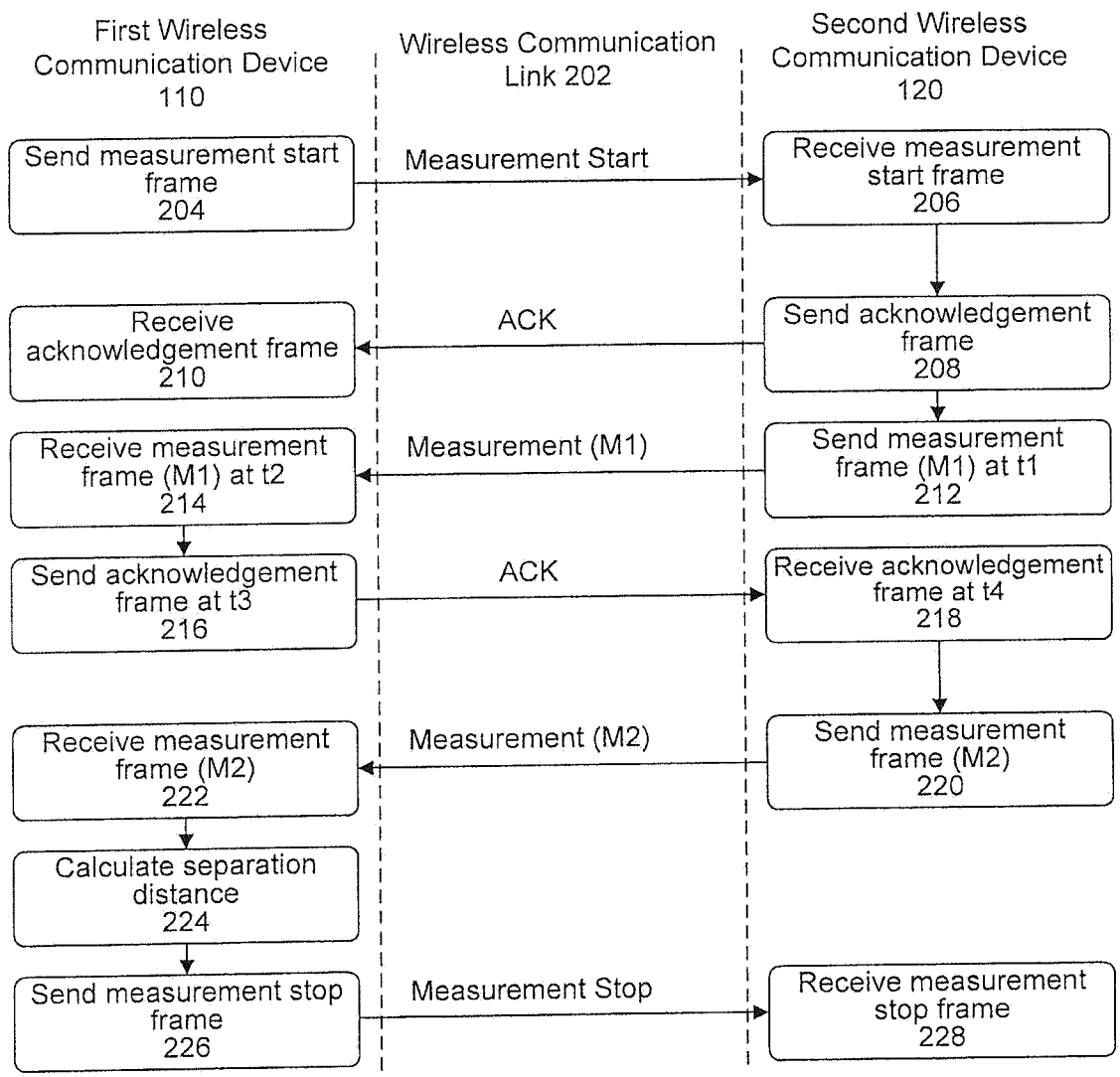
FIG. 2 is a flowchart of operational steps of a prior art method for determining a separation distance between wireless communication devices (e.g., wireless ranging).

FIG. 2 is a flowchart of operational steps of a prior art method for determining a separation distance between two wireless communication devices (e.g., wireless ranging). The flowchart of FIG. 2 is described with reference to embodiments of FIG. 1.

The method 200 begins with operation 204, where first wireless communication device 110 sends a measurement start frame to second wireless communication device 120 over a wireless communication link 202. In operation 206, second wireless communication device 120 receives the measurement start frame and responds by sending an acknowledgement frame back to first wireless communication device 110 in operation 208. The acknowledgement frame is received by first wireless communication device 110 in operation 210. In operation 212, second wireless communication device 120 sends a first measurement frame (M1) to first wireless communication device 110. The time at which second wireless communication device 120 sends first measurement frame (M1) is referred to herein as a first time of departure (t1). In operation 214, first measurement frame (M1) is received by first wireless communication device 110 at a time referred to herein as a first time of arrival (t2). First wireless communication device 110 then sends its own acknowledgement frame back to second wireless communication device 120 in operation 216, which is then received in operation 218. The time at which first wireless communication device 110 sends its acknowledgement frame back to second wireless communication device 120 is referred to herein as a second time of departure (t3), and the time at which second wireless communication device 120 receives the acknowledgement frame from first wireless communication device 110 is referred to herein as a second time of arrival (t4).

In operation 220, second wireless communication device 120 sends a second measurement frame (M2) to first wireless communication device 110, and first wireless communication device 110 receives second measurement frame (M2) in operation 222. Second measurement frame (M2) includes information identifying the first time of departure (t1) and the second time of arrival (t4), both of which were determined by second wireless communication device 120.

Upon receipt of second measurement frame (M2) from second wireless communication device 120, first wireless communication device 110 has the necessary information to calculate the round trip time (R11) relative to second wireless communication device 120. Indeed, RTT can be calculated using the four timestamps (t1-t4) determined in operations 212-218—i.e., using the first time of arrival (t2) and the second time of departure (t3) already known to first wireless communication device 110, as well as the first time of departure (t1) and second time of arrival (t4) received from second wireless communication device 120 in measurement frame (M2). Specifically, first wireless communication device 110 can calculate RTT using the following equation: RTT=(t4−t1)−(t3−t2). Once RTT has been calculated, first wireless communication device 110 can then calculate its separation distance from second wireless communication device 120 in operation 224 using the following equation: Distance=(c/2)*RTT, where c represents the speed of light. First wireless communication device 110 may then share this calculated distance measurement with second wireless communication device 120 by including the measurement value in a subsequent frame sent back to second wireless communication device 120. At that point, the separation distance between first and second wireless communication devices 110 and 120 are known to both devices.

Once the separation distance has been determined, and all necessary communication frames have been exchanged, first wireless communication device 110 then sends a measurement stop frame in operation 226 that is subsequently received by second wireless communication device 120 in operation 228.

As discussed above, second wireless communication device 120 may compare the calculated separation distance to its known communication area 130 to determine whether first wireless communication device 110 is close enough to allow a signal transmitted from first wireless communication device 110 (e.g., an unlock signal) to elicit a responsive action from second wireless communication device 120 (e.g., unlocking the contents of the device).

Figure 3:
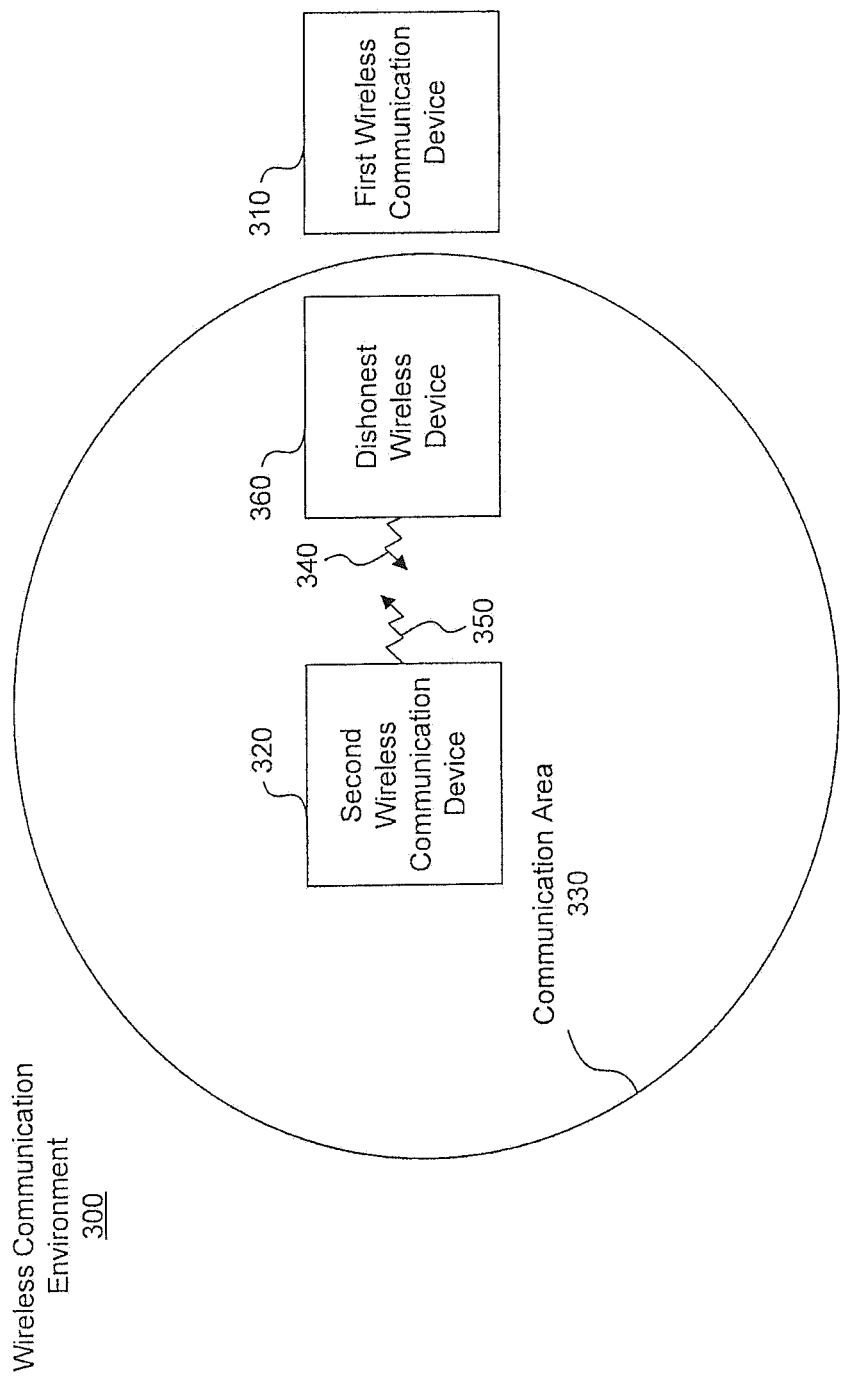
FIG. 3 illustrates a block diagram of a second wireless communication environment according to an exemplary embodiment of the disclosure.

While the prior art method outlined in FIG. 2 provides some security advantages in terms of ensuring that authorized wireless communication devices (honest wireless communication devices) are sufficiently close to one another before responsive actions can be elicited, such a method is unable to prevent many types of attacks that may be attempted by dishonest wireless communication devices that are present within wireless communication environment 100. For the purposes of the present disclosure, a dishonest wireless communication device is considered to be a wireless communication device operated by an individual who wishes to gain access to second wireless communication device 120 without authorization to do so. A dishonest wireless communication device attempting to gain unauthorized access to second wireless communication device 120 is referred to herein as a "relay attack." Relay attacks come in many different forms, including distance fraud attacks, mafia fraud attacks, terrorist fraud attacks, and distance hijacking. And while each type of relay attack presents its own unique challenges, mafia fraud attacks are generally considered to be the most serious since these attacks can be mounted without the notice of either honest wireless communication devices (e.g., wireless communication devices 110 and 120). As illustrated in FIG. 3, a mafia fraud attack involves an adversary who performs a kind of man-in-the middle attack between two honest wireless communication devices.

Specifically, FIG. 3 illustrates a block diagram of a wireless communication environment 300 according to an exemplary embodiment of the disclosure. Wireless communication environment 300 may provide wireless communication of information, such as one or more commands and/or data, between a first wireless communication device 310 and a second wireless communication device 320. First wireless communication device 310 and a second wireless communication device 320 may represent exemplary embodiments of first wireless communication device 110 and second wireless communication device 120, respectively. Moreover, the "first" and "second" designations applied to the two wireless communication devices disclosed herein are for illustrative purposes only. Indeed, in some embodiments, the "first" designation may be used to refer to second wireless communication device 320, and the "second" designation may be used to refer to first wireless communication device 310.

Unlike wireless communication environment 100, which was void of any dishonest wireless communication devices, wireless communication environment 300 includes a dishonest wireless communication device 360. In an exemplary embodiment, dishonest wireless communication device 360 is positioned between first wireless communication device 310 and second wireless communication device 320 in an attempt to carry out a mafia fraud attack. In this scenario, dishonest wireless communication device 360 may be capable of intercepting second wireless signal 350 before it reaches its intended target: first wireless communication device 310. Upon doing so, dishonest wireless communication device 360 may be configured to send its own dishonest wireless signal 340 back to second wireless communication device 320. Using the dishonest wireless signal 340, dishonest wireless communication device 360 may be able to trick second wireless communication device 320 into believing that first wireless communication device 310 is closer than it actually is—e.g., within communication area 330, and specifically at dishonest wireless communication device 360's location. The end result is that dishonest wireless communication device 360 may be given unauthorized access to the contents of second wireless communication device 320.

For illustrative purposes only, the specific operations that dishonest wireless communication device 360 can perform in order to carry out such a mafia fraud attack are described with reference to the operational steps of FIG. 2. For example, when dishonest wireless communication device 360 is positioned between first and second wireless communication devices 310 and 320, dishonest wireless communication device 360 may be capable of intercepting the acknowledgement frame and measurement frame (M1) sent by second wireless communication device 320. Dishonest wireless communication device 360 can then send its own acknowledgement frame back to second wireless communication device 320. The acknowledgement frame generated by dishonest wireless communication device 360 may be configured to appear as though it originated from first wireless communication device 310, even though first wireless communication device 310 may be located outside of communication area 330. Dishonest wireless communication device 360 may be capable of generating this dishonest acknowledgement frame for three reasons.

First, dishonest wireless communication device 360 may be capable of estimating the wait time required before an acknowledgement frame can be sent back to second wireless communication device 320. In an embodiment, this required wait time may represent the delay between first wireless communication device 310 receiving measurement frame (M1) in operation 214 and sending an acknowledgement frame in operation 216, had second wireless communication device 320 been communicating with first wireless communication device 310 as intended. As will be apparent to persons skilled in the relevant art(s), the IEEE 802.11v and 802.11mc standards require that first wireless communication device 310 must wait a certain amount of time before it can send an acknowledgement frame back to second wireless communication device 320. This wait time is referred to herein as a short interframe space (SIFS). In an embodiment, this wait time may create a time gap during which dishonest wireless communication device 360 can potentially intercept measurement frame (M1), and generate and send back its own dishonest acknowledgement frame (illustrated as dishonest wireless signal 340 in FIG. 3).

Second, acknowledgement frames generally have a known deterministic payload, and can thus be ascertained and copied by dishonest wireless communication device 360.

Third, acknowledgement frames generally are not encrypted or authenticated, and can thus be tampered with.

For example, second wireless communication device 320 may be configured to send measurement frame (M1) over a 20 MHz channel, with a sampling rate of 40 MHz. In such a scenario, the required SIFS would represent approximately 25 nanoseconds of uncertainty, which translates to approximately 7.5 meters of uncertainty. Therefore, in this illustrative example, by generating a dishonest acknowledgment frame slightly earlier than required by IEEE 802.11v and 802.11mc—e.g., approximately 10 nanoseconds earlier—the dishonest wireless communication device 360 may be able to trick second wireless communication device 320 into thinking that first wireless communication device 310 is up to approximately 7.5 meters closer than it actually is. In some embodiments, the second wireless communication device 320 may not be able to discern that the dishonest acknowledgment frame was transmitted from dishonest wireless communication device 360.

In addition to generating a dishonest acknowledgement frame, dishonest wireless communication device 360 can also carry out a mafia attack by manipulating the timestamp information contained in measurement frames (M1) and (M2), and thereby making first wireless communication device 310 appears closer than it actually is—e.g., at dishonest wireless communication device 360's location. Similar to the acknowledgement frames, measurement frames (M1) and (M2) are also generally not encrypted or authenticated, this making is possible for dishonest wireless communication device 360 to manipulate the contents of these frames.

The end result of such mafia attacks is that dishonest wireless communication device 360 can potentially gain unauthorized access to the contents of second wireless communication device 320.

As is evident from the preceding discussion, the prior art method outlined in FIG. 2 is unable to prevent many types of relay attacks, such as the mafia fraud attack illustrated in FIG. 3. The shortcomings inherent in this prior art method can generally be attributed to the fact that the signals exchanged between first and second wireless communication devices 310 and 320 are usually not encrypted or authenticated in any meaningful way. Therefore, even using the prior art method of FIG. 2, dishonest wireless communication device 360 may still be able to carry out relay attacks, such as the mafia fraud attack illustrated in FIG. 3.

However, in accordance with the present disclosure, a method can be implemented that allows for the secure determination of a separation distance between first and second wireless communication devices 310 and 320 (e.g., secure wireless ranging). This secure wireless ranging method involves performing a security handshake mechanism prior to exchanging measurement frames between the first and second wireless communication devices 310 and 320. The method also includes using a pre-shared key to derive a transient key that can be used to protect the exchanged measurement frames. Additionally, the disclosed secure wireless ranging method also allows for encryption of the acknowledgement frames exchanged between first and second wireless communication devices 310 and 320.

Figure 4:
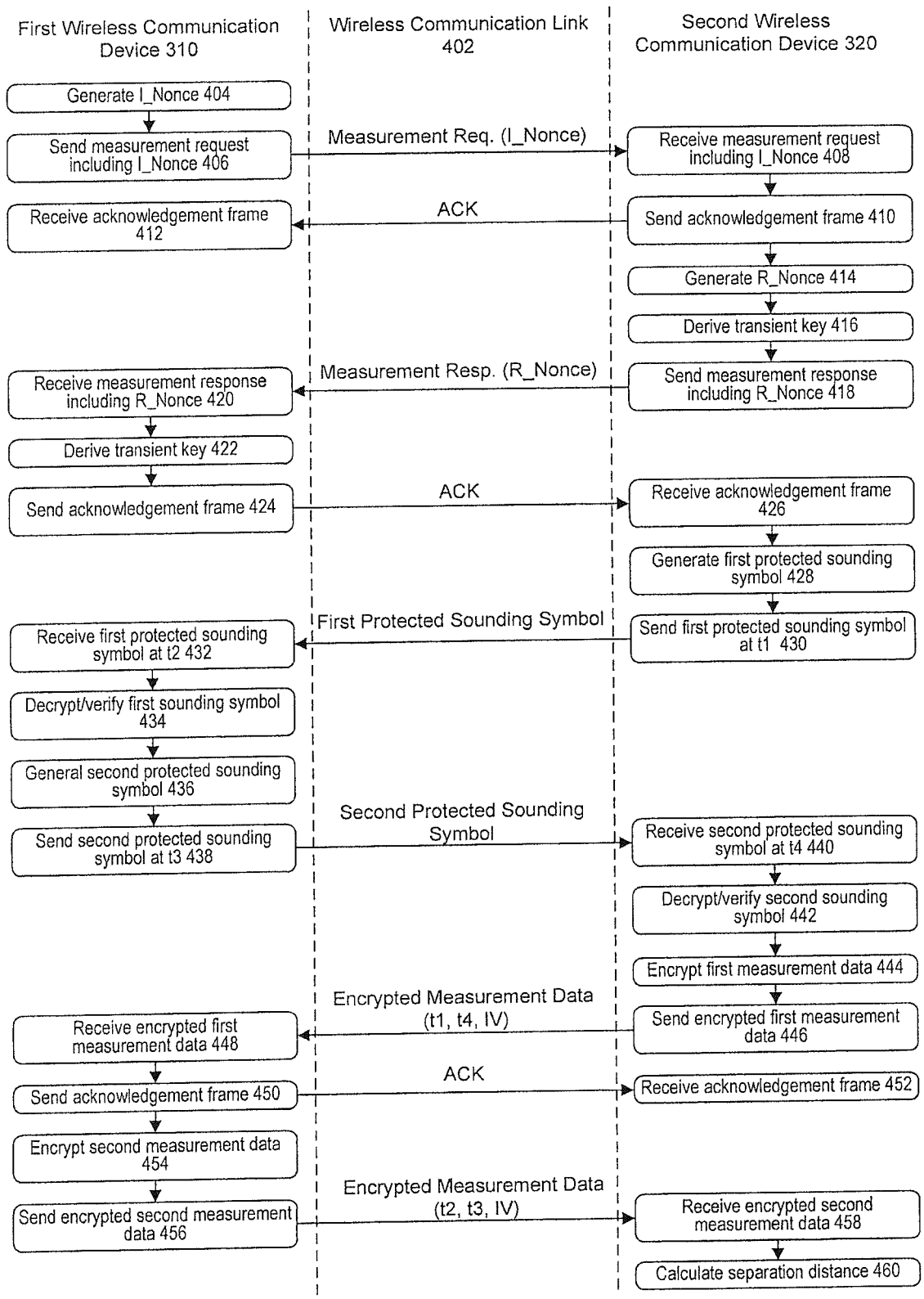
FIG. 4 is a flowchart of exemplary operational steps of securely determining a separation distance between wireless communication devices (e.g., secure wireless ranging) according to an exemplary embodiment of the present disclosure.

FIG. 4 is a flowchart of exemplary operational steps of securely determining a separation distance between first and second wireless communication devices (e.g., secure wireless ranging) according to an exemplary embodiment of the present disclosure. The disclosure is not limited to this operational description. Rather, it will be apparent to persons skilled in the relevant art(s) from the teachings herein that other operational control flows are within the spirit and scope of the present disclosure. The following discussion describes the steps in FIG. 4. The flowchart of FIG. 4 is described with reference to embodiments of FIGS. 1 and 3. However, a method 400 is not limited to these embodiments.

The method 400 begins with operation 404, where first wireless communication device 310 generates an I_Nonce value. I_Nonce may be a randomly generated value comprising any number of random bytes. For example, the I_Nonce generated by first wireless communication device 310 may be a 256 bit random identifier (e.g., 32 bytes). Additionally, the I_Nonce value may be configured as a one-time only value. Therefore, a new I_Nonce value may be generated for each communication session initiated between first and second wireless communication devices 310 and 320. A communication session may represent a time period beginning when first wireless communication device 310 sends a measurement request and ending when the first wireless communication device 310 sends a stop signal.

In operation 406, first wireless communication device 310 sends a measurement request, including the generated I_Nonce value, to second wireless communication device 320 over wireless communication link 402. Second wireless communication device 320 receives the measurement request and I_Nonce value in operation 408, and in operation step 410, responds by sending an acknowledgement frame back to first wireless communication device 310, which is then received in operation 412. In operation 414, second wireless communication device 320 generates an R_Nonce value. Similar to the I_Nonce value generated by first wireless communication device 310, R_Nonce may also be a randomly generated value comprising any number of random bytes, such as a 256 bit random identifier. In an embodiment, second wireless communication device 320 may extract the I_Nonce value received from first wireless communication device 310, and use the extracted value to generate a corresponding R_Nonce value.

In operation 416, second wireless communication device 320 derives a transient key. In an embodiment, the transient key may be derived using a similar derivation technique as the four-way handshake technique disclosed in IEEE 802.11i. (See, e.q., IEEE 802.11-04/0123r1, the contents of which are incorporated by reference herein in their entirety.) Indeed, second wireless communication device 320 may derive the transient key using the I_Nonce and R_Nonce values, along with a pre-shared key. For example, in an embodiment, the I_Nonce, R_Nonce and pre-shared key values may be fed into a pseudo random function generator, and the resulting value may represent the transient key. In an embodiment, the resulting transient key may represent a byte stream that is unique for each communication session. For example, the transient key may be a sequence of 232 randomized bits.

In an embodiment, the purpose of the transient key is to encrypt and decrypt the measurement data communicated between first and second wireless communication devices 310 and 320. The derived key is configured to be transient such that it may only be used for a single communication session between first and second wireless communication devices 310 and 320. Indeed, once the transient key is used, it becomes a known value, and thus could potentially be spoofed by dishonest wireless communication device 360 if the transient key were to be reused for future communication sessions. Therefore, by configuring the key to be transient, and thus limiting its use to a single communication session, future attacks by dishonest wireless communication device 360 can be mitigated.

The aforementioned pre-shared key may be a shared password that is known to both first and second wireless communication devices 310 and 320, and the purpose of which may be to authenticate both devices before any measurement data is exchanged between the devices. The pre-shared key may also be obtained from each of the devices operating systems (see FIG. 5). As an illustrative example, the pre-shared key may be a password associated with a cloud-based account belonging to a user of both first and second wireless communication devices 310 and 320. By using the pre-shared key to derive the transient key, only devices that know the pre-shared key—e.g., devices belonging to the same cloud-based account—will be able to encrypt and decrypt the measurement data that needs to be exchanged for secure wireless ranging to be performed.

In operation 418, second wireless communication device 320 sends the generated R_Nonce value back to first wireless communication device 310, which is then received in operation 420. In operation 422, first wireless communication device 310 derives the transient key using a substantially similar process as second wireless communication device 320 in operation 416. For example, first wireless communication device 310 may also derive the transient key by inputting the I_Nonce, R_Nonce, and pre-shared key values into a pseudo random function generator that implements the same randomization algorithm as the pseudo random function generator used by second wireless communication device 310. In other words, because both first and second wireless communication devices 310 and 320 input the same I_Nonce, R_Nonce, and pre-shared key values (assuming that both devices belong to the same cloud-based account) into substantially similar pseudo random function generators, both first and second wireless communication devices 310 and 320 should derive the same transient key.

If the transient keys derived by first and second wireless communication devices 310 and 320 (operations 416 and 422, respectively) match, then the devices will be able to successfully determine their separation distance (e.g., perform secure wireless ranging) by exchanging encrypted measurement data. However, if the transient keys derived by first and second wireless communication devices 310 and 320 do not match, then the devices will be unable to encrypt and decrypt the necessary measurement data, and a correct separation distance may not be attainable. As an illustrative example, the transient keys may not match when first wireless communication device 310 is replaced by dishonest wireless communication device 360, which may represent a device that does not belong to the same cloud-based account as second wireless communication device 320, and thus a device that does not know the pre-shared key.

In operation 424, first wireless communication device 310 sends an acknowledgement frame back to second wireless communication device 320, which is then received in operation 426.

In operation 428, second wireless communication device 120 generates a first protected sounding symbol. In an embodiment, the sounding symbol may represent a long training field, a short training field, a Wi-Fi symbol, or the like. However, other values may also be used to represent the sounding symbol without departing from the spirit and scope of the present disclosure. Additionally, different sets of randomized bits may be used to encrypt the sounding symbol. In some embodiments, the bits may be grouped into sets of 52, 104, or 208 bits, to provide some examples. However, bits may be grouped together in any number ranging from 24 bits to 232 bits without departing from the spirit and scope of the present disclosure. As an illustrative example, second wireless communication device 320 may encrypt the sounding symbol using a second set of 52 bits from the derived transient key (e.g., bits 53-104 of the transient key's 232 bit sequence). The encryption may be carried out by performing a bitwise multiplication of the second set of 52 bits and the sounding symbol. Once the first protected sounding symbol is generated, it is sent to first wireless communication device 310 in operation 430, and received in operation 432.

In operation 434, first wireless communication device 310 decrypts the received first protected sounding symbol to verify the sounding symbol's payload. For example, first wireless communication device 310 may decrypt the first protected sounding symbol and compare the resulting sequence with the second set of 52 bits from the derived transient key. When the decrypted sequence matches the second set of 52 bits from the derived transient key, the identity of second wireless communication device 320 is verified. If, however, the decrypted sequence and the second set of 52 bits from the derived transient key do not match, then the second wireless communication device 320 is deemed to be dishonest and the received sounding symbol is rejected.

Once the received first sounding symbol is verified, first wireless communication device 310 generates a second protected sounding symbol in operation 436. Similar to the first protect sounding symbol, the second sounding symbol may represent a long training field, a short training field, or a Wi-Fi symbol, to provide some examples. To generate the second protected sounding symbol, first wireless communication device 310 may encrypt the sounding symbol using a first set of 52 bits from the derived transient key (e.g., bits 1-52 of the transient key's 232 bit sequence). The encryption may be carried out by performing a bitwise logical XOR operation of the first set of 52 bits and the sounding symbol. Once the second protected sounding symbol is generated, it is sent back to second wireless communication device 320 in operation 438, and is received in operation 440.

In operation 442, second wireless communication device 320 decrypts the received second protected sounding symbol to verify the sounding symbol's payload. For example, second wireless communication device 320 may decrypt the second protected sounding symbol and compare the resulting sequence with the first set of 52 bits from the derived transient key. When the decrypted sequence matches the first set of 52 bits from the derived transient key, the identity of first wireless communication device 310 is verified. If, however, the decrypted sequence and the first set of 52 bits from the derived transient key do not match, then first wireless communication device 310 is deemed to be dishonest and the received sounding symbol is rejected.

Once the identity of both devices is verified, then measurement data can be exchanged. In operation 444, second wireless communication device 320 encrypts a first set of measurement data. In an embodiment, the first set of measurement data may be encrypted using an encryption key comprising the last 128 bits from the derived transient key (e.g., bits 105-232 of the transient key's 232 bit sequence). The first set of measurement data may include several different values including timestamps t1 and t4, where timestamp t1 represents the time when second wireless communication device 320 sends the first protected sounding symbol (operation 430), and where timestamp t4 represents the time when second wireless communication device 320 receives the second protected sounding symbol (operation 440).

In operation 446, second wireless communication device 320 sends the first set of encrypted measurement data to first wireless communication device 310. And in operation 448, the first set of encrypted measurement data is received at first wireless communication device 310. In operation 450, first wireless communication device 310 sends and acknowledgment frame back to second wireless communication device 320, which is then received in operation 452.

In operation 454, first wireless communication device 310 encrypts a second set of measurement data. Similar to the first set of measurement data, the second set of measurement data may be encrypted using an encryption_key comprising the last 128 bits from the derived transient key. The second set of measurement data may include several different values including timestamps t2 and t3, where timestamp t2 represents the time when first wireless communication device 310 receives the first protected sounding symbol (operation 432), and where timestamp t3 represents the time when first wireless communication device 310 sends the second protected sounding symbol (operation 438).

In operation 456, first wireless communication device 310 sends the second set of encrypted measurement data to second wireless communication device 320. And in operation 458, the second set of encrypted measurement data is received at second wireless communication device 320. Unlike measurement frames (M1) and (M2) from the prior art wireless ranging method of FIG. 2, the first and second sets of encrypted measurement data used in the secure wireless ranging method of FIG. 4 are unique to each communication session, and cannot be predicted or replayed by dishonest wireless communication device 360.

Upon receipt of the second set of encrypted measurement data from first wireless communication device 310, second wireless communication device 320 has the necessary information to calculate the RTT relative to first wireless communication device 310. Indeed, RTT can be calculated using the four timestamps (t1–t4) determined in steps 430, 432, 438, and 440. For example, second wireless communication device 320 can calculate RTT using the following equation: RTT=(t4−t1)−(t3−t2). Once RTT has been calculated, second wireless communication device 320 then calculates its separation distance from first wireless communication device 310 in operation 460 using the following equation: Distance=(c/2)*RTT, where c represents the speed of light. Additionally, once first wireless communication device 310 receives first measurement data in operation 448, it also has the necessary information to calculate RTT and to subsequently calculate its separation distance from second wireless communication device 320. Thus, first wireless communication device 310 may calculate the separation distance at any time following operation 448 (not shown in FIG. 4).

As discussed above, second wireless communication device 320 may then compare the calculated separation distance to its known communication area 330 to determine whether first wireless communication device 310 is close enough to allow a signal transmitted from first wireless communication device 310 (e.g., an unlock signal) to elicit a responsive action from second wireless communication device 320 (e.g., unlock a corresponding piece of equipment).

In some instances, the first and second sets of measurement data may be determined and exchanged between first and second wireless communication devices 310 and 320 multiple times in an effort to increase the accuracy and reliability of these measurements. For example, it may be desirable to take the average of multiple sets measurement data, or to apply a confidence factor to the multiple sets of measurement data, in order to avoid erroneous measurements. In these instances, it may be undesirable to carry out the initial handshake process (operations 404-442) each time measurement data is exchanged. Therefore, an initialization vector (IV) may be included in the first and second sets of measurement data as a means for avoiding having to carry out multiple handshake processes, in which case, only operations 444-460 would be repeated for each successive determination and exchange of measurement data. IV may represent a monotonically increasing number that can be combined with the transient key such that a different sequence of bits is used to encrypt each new set of measurement data. In an embodiment, IV may be concatenated with the transient key to derive a pseudo random function, which may then be combined with the measurement data using an XOR function to produce new sets of encrypted data.

In an embodiment, second wireless communication devices 320 may also be configured to detect, log, and/or lockout dishonest wireless communication devices that attempt to gain unauthorized access to its contents. For example, second wireless communication devices 320 may be configured to obtain identifying information about a dishonest wireless communication device through the signals received from the dishonest device. Second wireless communication devices 320 may also be configured to log ancillary information about the dishonest wireless communication device's attempted access into memory. In an embodiment, this ancillary information may include a time of the attempted access, or a location from where the access was attempted. In such a scenario, second wireless communication devices 320 may refuse to unlock its contents for the dishonest wireless communication device, and/or may also remain in a locked state until it receives an input from an authorized user.

Figure 5:
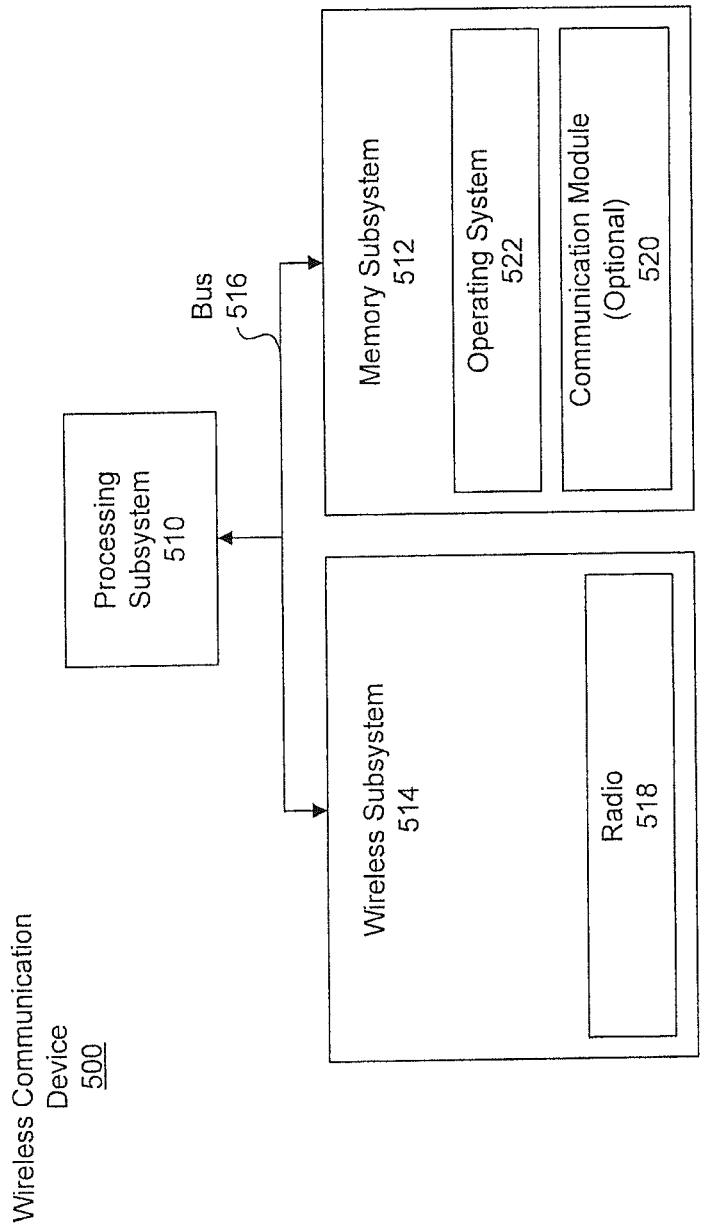
FIG. 5 illustrates a block diagram of a wireless communication device according to an exemplary embodiment of the disclosure.

The internal components of first and second wireless communication devices 310 and 320 will now be described in further detail with references to FIG. 5. FIG. 5 illustrates a block diagram of a wireless communication device 500 according to an exemplary embodiment of the disclosure. Wireless communication device 500 may represent an exemplary embodiment of first wireless communication devices 110 and 310, or second wireless communication devices 120 and 320. Wireless communication device 500 may include a processing subsystem 510, a memory subsystem 512, and a wireless subsystem 514.

Processing subsystem 510 may include one or more devices that perform computational operations. For example, processing subsystem 510 can include one or more microprocessors, application-specific integrated circuits (ASICs), microcontrollers, and/or programmable-logic devices. Processing subsystem 510 may execute an operating system 522 (stored in memory subsystem 512) that includes procedures (or a set of instructions) for handling various basic system services for performing hardware-dependent tasks.

Memory subsystem 512 may include one or more devices for storing data and/or instructions for processing subsystem 510 and wireless subsystem 514. For example, memory subsystem 512 can include dynamic random access memory (DRAM), static random access memory (SRAM), and/or other types of memory. More generally, memory subsystem 512 may include volatile memory and/or non-volatile memory that are configured to store information. In addition, memory subsystem 512 can include mechanisms for controlling access to the memory. In some embodiments, memory subsystem 512 includes a memory hierarchy that comprises one or more caches coupled to a memory in electronic device 500. Additionally or alternatively, one or more of the caches may be located in processing subsystem 510.

Moreover, memory subsystem 512 may be coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device may be used to store less frequently used data.

Wireless subsystem 514 may include processors, controllers, radios/antennas, sockets/plugs, and/or other devices used for engaging in wireless communication with another wireless communication device—e.g., communicating packets or frames with another device via a wireless communication link. As discussed previously, those skilled in the relevant art(s) will recognize that wireless communication device 500 may be configured to communicate using any one of Wi-Fi, Bluetooth, radio-frequency identification (RFID), near field communications (NFC), 60 GHz communications, cellular communication, or the like. Therefore, wireless subsystem 514 may be configured to enable communication with another wireless communication device via any one of these wireless protocols. The mechanisms used for coupling to, communicating on, and handling data and events on the wireless link may be referred to collectively as an "interface" or "wireless interface" herein.

Within electronic device 500, processing subsystem 510, memory subsystem 512, and wireless subsystem 514 may be coupled together using bus 516. Bus 516 may be an electrical, optical, or electro-optical connection that the subsystems can use to communicate commands and data among one another. Although wireless communication device 500 is shown with only one bus 516, a different number or configuration of electrical, optical, or electro-optical connections among the subsystems is possible without departing from the spirit and scope of the present disclosure.

Similarly, wireless communication device 500 may be implemented as a standalone or a discrete device or may be incorporated within or coupled to another electrical device or host device, such as a cellphone, smartwatch, portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

In an embodiment, wireless communication device 500 may include one or more additional processing subsystems 510, memory subsystems 512, and/or wireless subsystems 514. Additionally, it may be possible for one or more of these subsystems to be omitted from wireless communication device 500. Moreover, wireless communication device 500 may include one or more additional subsystems that are not shown in FIG. 5. For example, electronic device 500 can include, but is not limited to: a display subsystem for displaying information, a data collection subsystem, an audio and/or video subsystem, an alarm subsystem, a media processing subsystem, and/or an input/output (I/O) subsystem. Also, although separate subsystems are shown in FIG. 5, some or all of a given subsystem can be integrated into one or more of the other subsystems in wireless communication device 500 and/or positions of components in electronic device 500 can be changed without departing from the spirit and scope of the present invention.

Now turning back to wireless subsystem 514. As illustrated in FIG. 5, wireless subsystem 514 may include radio 518, which itself may include hardware and/or software mechanisms that can be used for transmitting and receiving wireless signals to and from other wireless communication devices. Although wireless subsystem 514 is described having only a single radio 518, those skilled in the relevant art(s) will recognize that additional radios could also be included.

In an embodiment, wireless communication between device 500 and other wireless communication devices may be implemented using low-level hardware, such as in a physical layer, a link layer and/or a network layer in a network architecture. For example, wireless communication may, at least in part, be implemented in a media access control layer. However, in other embodiments at least some of the wireless communication operations are performed by one or more programs, modules, or sets of instructions (such as optional communication module 520 stored in memory subsystem 512), which may be executed by processing subsystem 510. The one or more programs may constitute a computer-program mechanism. Furthermore, instructions in the various modules in memory subsystem 512 may be implemented in: a high-level procedural language, an object-oriented programming language, and/or in an assembly or machine language. Note that the programming language may be compiled or interpreted, e.g., configurable or configured, to be executed by processing subsystem 510.

As discussed above, wireless communication device 500 may represent an exemplary embodiment of first wireless communication device 110 or 310, and/or second wireless communication device 120 or 320. In such scenarios, processing subsystem 510 may be configured to perform at least the following functions associated with the secure wireless ranging method illustrated in FIG. 4: generating I_Nonce values; generating R_Nonce values; deriving a transient key for each communication session; generating sounding symbols for transmission to other wireless communication devices; encrypting the generated sounding symbols; demodulating and decrypting protected sounding symbols received from other wireless communication devices; verifying each sounding symbol's payload; encrypting and decrypting measurement data; calculating a separation distance between wireless communication device 500 and other wireless communication devices; and determining whether other wireless communication devices are within a communication area associated with wireless communication device 500.

Moreover, wireless subsystem 514 may be configured to perform at least the following functions associated with the secure wireless ranging method illustrated in FIG. 4: sending/receiving I_Nonce values; sending/receiving R_Nonce values; sending/receiving acknowledgement frames; sending/receiving protected sounding symbols; and sending/receiving encrypted measurement data.

The procedures (or set(s) of instructions) for performing the aforementioned functions may be included in operating system 522 stored in memory subsystem 512. Additionally, memory subsystem 512 may be configured to store various other forms of information that are used during the secure wireless ranging method illustrated in FIG. 4, such as the pre-shared key, transient key, collected measurement data, and information about the communication area associated with wireless communication device 500, to provide some examples.

In an embodiment, a tangible apparatus or article of manufacture comprising a tangible computer useable or readable medium having control logic (software) stored thereon is also referred to herein as a computer program product or program storage device. This includes, but is not limited to, processing system 110, memory subsystem 512, operating system 522, and communication module 520, as well as tangible articles of manufacture embodying any combination of the foregoing. Such control logic, when executed by one or more data processing devices (such as processing system 110), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

Additionally, embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for performing secure wireless ranging, comprising:
    initiating a handshake process between a first wireless communication device and a second wireless communication device;
    collecting first measurement data at the first wireless communication device;
    encrypting the first measurement data using an initialization vector and a transient key to produce first encrypted measurement data;
    transmitting the first encrypted measurement data from the first wireless device to the second wireless communication device;
    receiving second encrypted measurement data from the second wireless communication device at the first wireless communication device;
    collecting third measurement data at the first wireless communication device;
    monotonically increasing the initialization vector to produce an updated initialization vector;
    encrypting the third measurement data using the updated initialization vector and the transient key to produce third encrypted measurement data; and
    determining a separation distance between the first and second wireless communication devices using the first, second, and third encrypted measurement data.

2. The method of claim 1, wherein the initiating the handshake process includes:
    receiving, at the first wireless communication device, a first random identifier and a measurement request from the second wireless communication device;
    generating a second random identifier at the first wireless communication device;
    deriving the transient key using the first random identifier, the second random identifier, and a pre-shared key, wherein the transient key comprises a first subsection, a second subsection, and a third subsection;
    generating a first sounding symbol at the first wireless communication device;
    encrypting the first sounding symbol using the first subsection of the transient key to produce a first protected sounding symbol;
    transmitting the first protected sounding symbol from the first wireless communication device to the second wireless communication device;
    receiving a second protected sounding symbol from the second wireless device at the first wireless communication device;
    decrypting, by the first wireless communication device, the received second protected sounding symbol; and
    determining, at the first wireless communication device, whether the decrypted second protected sounding symbol matches the second subsection of the transient key.

3. The method of claim 2, wherein the initiating the handshake process is performed only once.

4. The method of claim 1, wherein the initialization vector, and the method for increasing the initialization vector, is known to both the first and second wireless communication devices.

5. The method of claim 1, wherein the encrypting the first measurement data includes combining the initialization vector with the transient key such that a first sequence of bits is used to encrypt the first measurement data, and wherein the encrypting the third measurement data includes combining the initialization vector with the transient key such that a second sequence of bits is used to encrypt the third measurement data.

6. The method of claim 1, further comprising, at least one of:
    averaging, by the first wireless communication device, the first and third measurement data to avoid erroneous measurements; and
    applying a confidence factor, by the first wireless communication device, to the first and third measurement data to avoid erroneous measurements.

7. The method of claim 1, further comprising: concatenating the initialization vector with the transient key to derive a pseudo random function.

8. The method of claim 7,
    wherein the encrypting the first measurement data further comprises combining the pseudo random function with the first measurement data using an XOR function to produce the first encrypted measurement data; and
    wherein the encrypting the third measurement data further comprises combining the pseudo random function with the third measurement data using an XOR function to produce the third encrypted measurement data.

9. The method of claim 2, wherein the pre-shared key is a shared password that is known to both first and second wireless communication devices.

10. The method of claim 9, wherein the pre-shared key is incrementally updated, and wherein both the first and second wireless communication devices know a scheme for updating the pre-shared key.

11. A wireless communication device, comprising:
a wireless interface configured to:
initiate a one-time only handshake process with a second wireless communication device;
a hardware processor configured to:
collect first measurement data, and
encrypt the first measurement data using a transient key to produce first encrypted measurement data, wherein the first measurement data is encrypted by combining an initialization vector with the transient key such that a first sequence of bits is used to encrypt the first measurement data;
wherein the wireless interface is further configured to:
transmit the first encrypted measurement data to the second wireless communication device, and
receive second encrypted measurement data from the second wireless communication device,
wherein the hardware processor is further configured to:
collect third measurement data,
monotonically increase the initialization vector to produce an updated initialization vector;
encrypt the third measurement data using the transient key to produce third encrypted measurement data, wherein the third measurement data is encrypted by combining the updated initialization vector with the transient key such that a second sequence of bits is used to encrypt the third measurement data, and
determine a separation distance from the second wireless communication device using the first, second, and third encrypted measurement data; and
memory, coupled to the hardware processor, configured to store the transient key, the initialization vector, the first, second, and third measurement data, and a set of instructions for execution by the hardware processor.

12. The wireless communication device of claim 11, wherein the transient key is valid only for a single communication session with the second wireless communication device.

13. The wireless communication device of claim 11, wherein the memory is further configured to store a pre-shared key, wherein the pre-shared key is an identifier associated with a cloud-based account, and wherein both wireless communication devices belong to the cloud-based account.

14. The wireless communication device of claim 11, wherein the hardware processor is further configured to:
determine whether the second wireless communication device is outside of a communication area associated with the wireless communication device based on the determined separation distance; and
prevent a transmission of additional measurement data to the second wireless communication device when the second wireless communication device is determined to be outside of the communication area.

15. The wireless communication device of claim 11, wherein the memory is configured to be accessible to the second wireless communication device when the one-time only handshake process is successfully completed, and when the second wireless communication device is determined to be within a communication area associated with the wireless communication device based on the determined separation distance.

16. A secure wireless communication system, comprising:
a first wireless communication device, having a first processor, a wireless interface, and memory; and
a second wireless communication device, having a second processor, a wireless interface, and memory,
wherein the first wireless communication device is configured to:
initiate a handshake process with the second wireless communication device,
collect first measurement data,
encrypt the first measurement data using a transient key to produce first encrypted measurement data, wherein the first measurement data is encrypted by combining an initialization vector with the transient key such that a first sequence of bits is used to encrypt the first measurement data,
transmit the first encrypted measurement data to the second wireless communication device,
collect third measurement data, and
encrypt the third measurement data using the transient key to produce third encrypted measurement data, wherein the third measurement data is encrypted by combining the initialization vector with the transient key such that a third sequence of bits is used to encrypt the third measurement data, and
wherein the second wireless communication device is configured to:
complete the handshake process with the first wireless communication device,
collect second measurement data,
encrypt the second measurement data using a transient key to produce second encrypted measurement data, wherein the second measurement data is encrypted by combining the initialization vector with the transient key such that a second sequence of bits is used to encrypt the second measurement data, and
transmit the second encrypted measurement data to the first wireless communication device, and
wherein the first wireless communication device is further configured to:
determine a separation distance from the second wireless communication device using the first, second, and third encrypted measurement data.

17. The secure wireless communication system of claim 16, wherein the first wireless communication device is at least one of a cellphone or a smartwatch, and wherein the second wireless communication device is a computer.

18. The secure wireless communication system of claim 16, wherein the second wireless communication device is further configured to calculate a separation distance from the first wireless communication device using the first, second, and third encrypted measurement data.

19. The secure wireless communication system of claim 16, wherein the transient key is derived using a pre-shared key, wherein the pre-shared key is stored in the memory of the first wireless communication device and in the memory of the second wireless communication device, and wherein both the first and second wireless communication device are further configured to incrementally update the pre-shared key using a same scheme.

* * * * *